(12) United States Patent
Kubo et al.

(10) Patent No.: US 7,894,687 B2
(45) Date of Patent: Feb. 22, 2011

(54) METHOD AND AN APPARATUS FOR CORRECTING IMAGES

(75) Inventors: Masahiro Kubo, Kanagawa (JP); Yoshiya Ohara, Kanagawa (JP); Makoto Kagaya, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 971 days.

(21) Appl. No.: 11/526,703

(22) Filed: Sep. 26, 2006

(65) Prior Publication Data

US 2007/0071317 A1 Mar. 29, 2007

(30) Foreign Application Priority Data

Sep. 26, 2005 (JP) ............... 2005-277374

(51) Int. Cl.
*G06K 9/40* (2006.01)
*G06K 9/62* (2006.01)

(52) U.S. Cl. ...................... 382/274; 382/224

(58) Field of Classification Search ............ 382/115, 382/118, 162, 167, 173, 224, 254, 274, 282; 358/453, 464
See application file for complete search history.

(56) References Cited

U.S. PATENT DOCUMENTS

| | | | |
|---|---|---|---|
| 5,278,921 A * | 1/1994 | Nakamura et al. | 382/167 |
| 5,629,752 A * | 5/1997 | Kinjo | 355/35 |
| 5,978,100 A * | 11/1999 | Kinjo | 358/453 |
| 6,636,648 B2 * | 10/2003 | Loui et al. | 382/284 |
| 2002/0015514 A1 * | 2/2002 | Kinjo | 382/118 |
| 2004/0239983 A1 * | 12/2004 | Shiota | 358/1.15 |

FOREIGN PATENT DOCUMENTS

JP 10-020417 A 1/1998

* cited by examiner

*Primary Examiner*—Yon Couso
(74) *Attorney, Agent, or Firm*—Sughrue Mion, PLLC (57) ABSTRACT

The method and the apparatus for correcting images extract one or more features including information about face region for each of photographed images, classify the photographed images into groups of particular photographed images having at least one common feature in accordance with at least one of the extracted one or more features, calculate, for the particular photographed images that have been classified in one group, a common correction amount for adjusting the face region to have an appropriate color density in accordance with the extracted one or more features and a type of the one group and correct the particular photographed images belonging to the one group by the calculated common correction amount.

14 Claims, 4 Drawing Sheets

METHOD AND AN APPARATUS FOR CORRECTING IMAGES

The entire content of a document cited in this specification is incorporated herein by reference.

BACKGROUND OF THE INVENTION

This invention relates to the technical field of image processing. More particularly, it relates to an image correcting method and apparatus that can correct recorded images in such a way as to reduce the variation in consecutive scenes or similar scenes.

In the technology of preparing photographic prints by printing on photographic paper the images recorded on a photographic film by shooting, it has heretofore been proposed that either for all of the images that are recorded on the photographic film or for those images that are chosen on the basis of a camera's exposure and focusing precision, the amount of exposure common to the respective images should be determined on the basis of the average of the photometric values for those images or that the thus determined common amount of exposure should be further corrected to determine the amount of exposure for each of the images.

In certain cases such as where exposure by the same amount of light is dictated, the above-described method which uses the average of photometric values tends to cause a density failure or a color failure. With a view to preventing this problem, JP 10-20417 A proposes a photographic printer in which, given negative images that are to be exposed with the same amount of light, specific negative images for which appropriate individual amounts of exposure can presumably be calculated are chosen from the negative images, individual amounts of exposure are calculated for the chosen specific negative images, and the negative images that are to be exposed with the same amount of light are exposed on photographic paper using the average of the calculated individual amounts of exposure.

More specifically, the photographic printer of JP 10-20417 A is one of the direct-exposure type which performs exposure by projecting an image recorded on a photographic film onto a light-sensitive material (photographic paper) and in that printer, images that should be exposed with the same amount of light are determined on the basis of an FTPM signal, a series scene signal, shooting information and the like that are recorded in a magnetic recording layer on an APS film. Then, from among the negative images that, as has been determined, require exposure with the same amount of light, specific negative images are chosen by a selection method based either on the precision with which the principal area is extracted or on the amount of exposure correction, and the average of the individual amounts of light that are used to expose the specific negative images is calculated as a common amount of exposure. JP 10-20417 A also describes that the amount of exposure may optionally be adjusted using the history (shooting data) of each photographer.

SUMMARY OF THE INVENTION

In the photographic printer of JP 10-20417 A, images that should be exposed with the same amount of light are chosen on the basis of information related to shooting conditions such as an FTPM signal, a series scene signal and shooting information and, hence, a density failure and a color failure can be reduced by ensuring that images and the like that record similar scenes are exposed with the same amount of light.

However, in the photographic printer of JP 10-20417 A, the average of the individual amounts of light that is used to expose the specific negative images chosen from the negative images that should be exposed with the same amount of light is used as a common amount of exposure for such negative images. Therefore, even if the shooting conditions are the same, there may be a case where the pictures taken contain human subjects of different races who have greatly different flesh colors; in this case, if images that need to be exposed with greatly varying amounts of light due to the differences in density or color balance for the subjects themselves are chosen as specific negative images, one may not be able to obtain an appropriate amount of exposure, often ending up with a density failure or a color failure.

As a further problem, the photographic printer of JP 10-20417 A is applicable to only limited cases since the criteria for determining which negative images should be exposed with the same amount of light are simply the FTPM signal, the series scene signal and the shooting information.

The present invention has been accomplished in order to solve the aforementioned problems of the prior art.

An object of the present invention, therefore, is to provide a method of correcting images which, even in the presence of images having different features of subjects, in particular, different density and color features in the face regions of human subjects, can reproduce the densities and colors of their face regions in an appropriate manner and which, at the same time, can reduce the variation in the finish of consecutive scenes or similar scenes, as well as suppressing a density failure or a color failure.

Another object of the present invention is to provide an apparatus that can implement the method described above.

The first object of the present invention can be attained by a method of correcting images, comprising the steps of: extracting one or more features including information about face region for each of photographed images; classifying the photographed images into groups of particular photographed images having at least one common feature in accordance with at least one of the extracted one or more features; calculating, for the particular photographed images that have been classified in one group by the classifying step, a common correction amount for adjusting the face region to have an appropriate color density in accordance with the extracted one or more features and a type of the one group; and correcting the particular photographed images belonging to the one group by the calculated common correction amount.

In a preferred embodiment, the extracting step extracts as a feature a type of object in each of the photographed images.

In another preferred embodiment, the calculating step determines the common correction amount in accordance with the extracted type of object such that a color or color density of the face region matches a prescribed target color or color density.

In case that the one group contains two or more types of object, the prescribed target color is preferably altered for each type of object.

In a further preferred embodiment, the method of correcting images further comprises the step of performing face authentication based on the extracted information about the face region, and the classifying step classifies the photographed images into the groups of the particular photographed images in accordance with a result of the face authentication.

In another preferred embodiment, the extracting step extracts as a feature a shooting time of each of the photographed images, and the classifying step classifies the photographed images into the groups of the particular photographed images in accordance with a shooting interval for the photographed images.

In yet another preferred embodiment, the calculating step calculates an individual correction amount for each of the photographed images belonging to the one group in accordance with the extracted one or more features, and calculates the common correction amount for adjusting the face region to have the appropriate color density in accordance with the type of the one group based on calculated individual correction amounts for the photographed images belonging to the one group.

The second object of the present invention can be attained by an apparatus for correcting images, comprising: an extracting unit which extracts one or more features including information about face region for each of photographed images that have been inputted; a classifying unit which classifies the photographed images into groups of particular photographed images having at least one common feature in accordance with at least one of the one or more features extracted by the extracting unit; a correction calculating unit which calculates, for the particular photographed images that have been classified in one group by the classifying unit, a common correction amount for adjusting the face region to have an appropriate color density in accordance with the extracted one or more features and a type of the one group; and an image correcting unit which corrects the particular photographed images belonging to the one group by the calculated common correction amount as calculated by the correction calculating unit.

In a preferred embodiment, the extracting unit extracts as a feature a type of object in each of the photographed images.

In another preferred embodiment, the correction calculating unit determines the common correction amount in accordance with the type of object extracted by the extracting unit such that a color or color density of the face region matches a prescribed target color or color density.

In case that the one group contains two or more types of object, the prescribed target color is preferably altered for each type of object.

In a further preferred embodiment, the apparatus for correcting images further comprises: a face authentication unit which performs face authentication based on the information about the face region extracted by the extracting unit, and the classifying unit classifies the photographed images into the groups of the particular photographed images in accordance with a result of the face authentication performed by the face authentication unit.

In another preferred embodiment, the extracting unit extracts as a feature a shooting time of each of the photographed images, and the classifying unit classifies the photographed images into the groups of the particular photographed images in accordance with a shooting interval for the photographed images.

In yet another preferred embodiment, the correction calculating unit calculates an individual correction amount for each of the photographed images belonging to the one group in accordance with the one or more features extracted by the extracting unit, and calculates the common correction amount for adjusting the face region to have the appropriate color density in accordance with the type of the one group based on individual correction amounts calculated by the correction calculating unit for the photographed images belonging to the one group.

Having the design described above, the present invention offers the advantage in that, even in the presence of images having different features of subjects, in particular, different density and color features in the face regions of human subjects, it can reproduce the densities and colors of their face regions in an appropriate manner and, at the same time, it can reduce the variation in the finish of consecutive scenes or similar scenes, as well as suppressing a density failure or a color failure.

DETAILED DESCRIPTION OF THE INVENTION

The method and apparatus for correcting images in accordance with the present invention are described below in detail with reference to the preferred embodiments shown in the accompanying drawings.

Figure 1:
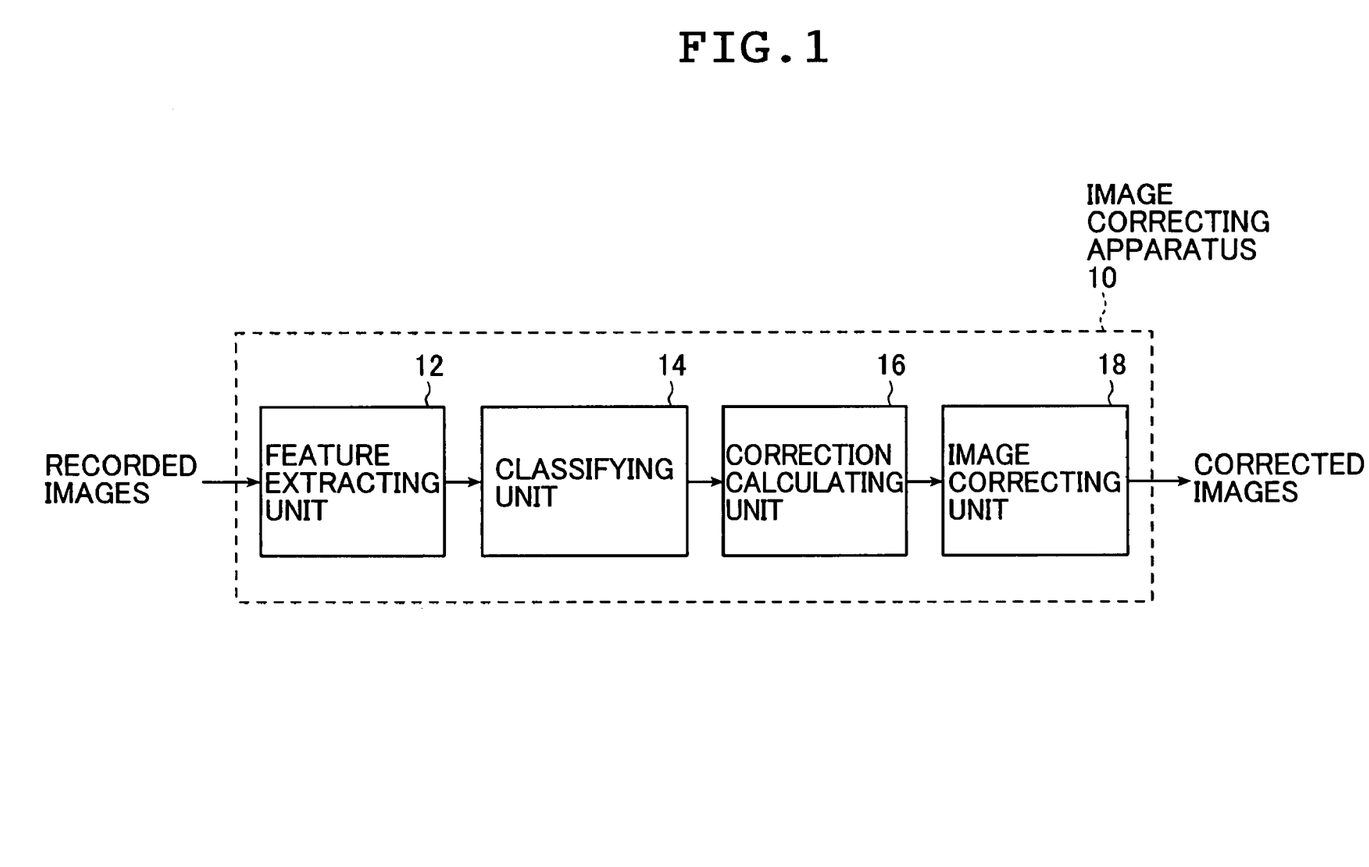
FIG. 1 is a block diagram showing an embodiment of the image correcting apparatus of the present invention.

FIG. 1 is a block diagram showing an embodiment of the image correcting apparatus of the present invention which implements the image correcting method of the invention.

The image correcting apparatus which is generally indicated by 10 in FIG. 1 is such that recorded images that have been entered are automatically classified into groups in accordance with the features of the images, the amount of correction is calculated using the information about the face region of each image, the thus calculated amounts of correction are used to determine the conditions for correction within the same group, the same amount of correction is applied to the images within the same group to correct those images, and the corrected images are output to a photographic printer or the like that perform digital exposure.

The image correcting apparatus 10 comprises a feature extracting unit 12, a classifying unit 14, a correction calculating unit 16, and an image correcting unit 18. These constituent elements of the image correcting apparatus 10 can be composed of hardware or software that executes specified computing processes.

Connected, either direct or indirect, to the image correcting apparatus 10 is an input machine such as an image input machine or a print order accepting machine. Such input machines are typically furnished with a media driver for reading image data from a variety of media on which image data acquired by shooting as with a digital camera have been recorded, network connecting equipment for acquiring image data via a communications line such as the Internet, a terminal for providing direct connection to a digital imaging device such as a digital camera or a cell phone with a camera, and a scanner for acquiring image data by photoelectrically reading the images recorded on a photographic film having these components, the input machine acquires the recorded images (image data) and the related information.

Figure 2:
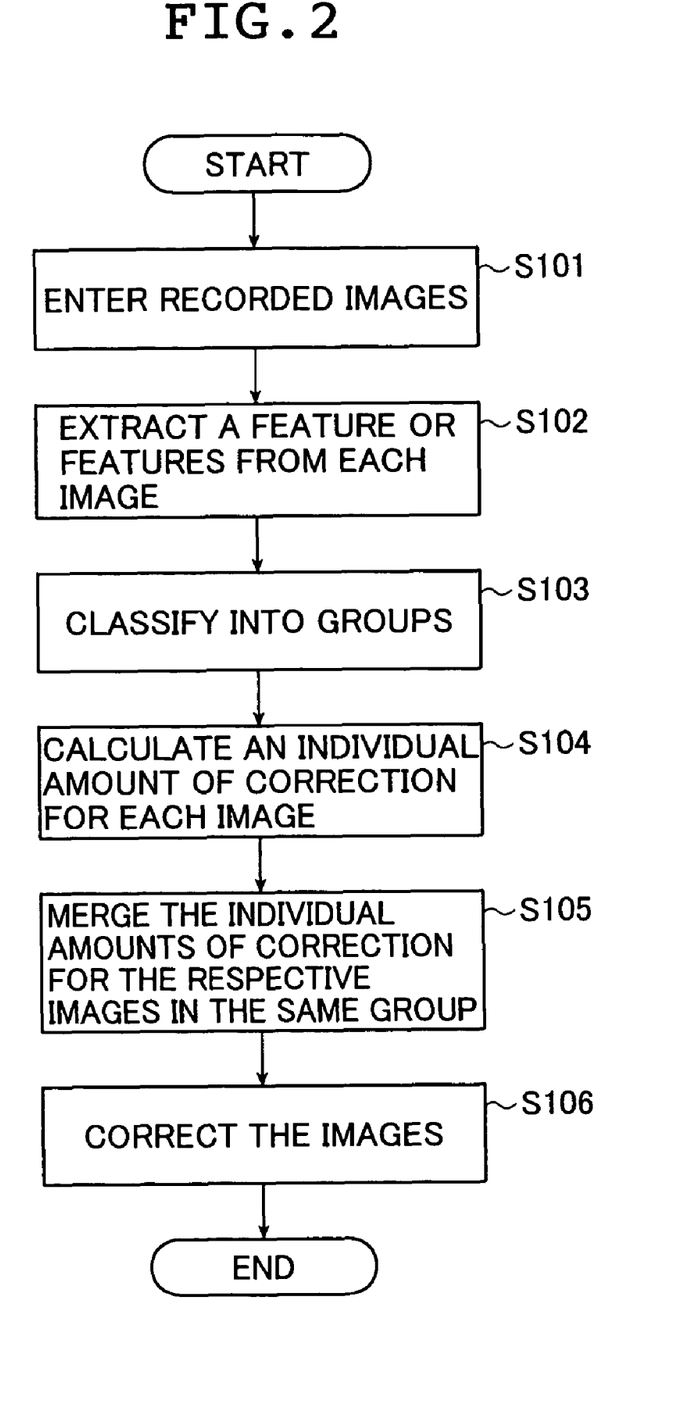
FIG. 2 is a flow chart of the process of image correction which is performed by the image correcting apparatus shown in FIG. 1.

The process of image correction to be implemented with the image correcting apparatus 10 is described below with reference to the flow chart shown in FIG. 2 while, at the same time, the operation of each component in the image correcting apparatus 10 will be explained.

First, recorded images are entered into the image correcting apparatus 10 (step S101).

The recorded images (image data) to be entered into the image correcting apparatus 10 typically are the image data acquired by shooting with a digital camera or the like, or the image data obtained by photoelectrically reading the images recorded on a photographic film.

The image data from a digital camera or the like may be directly entered into the image correcting apparatus 10 since minimum image processing that is necessary to reproduce the data has already been performed in the digital camera or the like. On the other hand, the image data obtained by photoelectrically reading the images recorded on a photographic film is entered into the image correcting apparatus 10 after ordinary image processing has been done to ensure that all images will be reproduced in a reasonably appropriate way.

The image correcting apparatus 10 is supplied with recorded images consecutively in suitable units, say, in numbers of prints for which orders have been placed.

Together with the recorded images, any related information that has been recorded in relation to the recorded images, such as the information about shooting and the information about print orders, is entered into the image correcting apparatus 10. Examples of such information include the information acquired during shooting such as the time of shooting, the model of the shooting camera and the shooting mode, as well as the information related to image processing that was designated by customers when they placed print orders.

In the case of images recorded with a digital camera, the information such as the time of shooting, the model of the shooting camera and the shooting mode is recorded as an Exif file or an appendix file related to the recorded images; in the case of images recorded on an APS film, the information that was recorded during shooting in the magnetic recording layer of the film and has been read therefrom is recorded as an appendix file related to the recorded images. For other types of recorded images, the information about shooting may be entered into an image input machine or the like by the user or the operator to prepare an auxiliary file.

The information about image processing may be exemplified by the information about finished color densities and the designation of an object that should serve as a reference for image processing. The information about finished color densities specifically comprises the information about the color densities preferred by the user, as well as the information about color densities that should be corrected in accordance with the shooting conditions (e.g., overexposure or underexposure).

The user may use the input function of the camera to enter the above-described information about image processing so that it is recorded on an Exif file or an appendix file related to the recorded images. Alternatively, the user (customer) or the operator (print service provider) may enter necessary information by means of a print order accepting machine, an image input machine or the like so that it is recorded on an Exif file or an appendix file.

The information about image processing may be set for each image or it may be set as information common to images that comprise a single group according to a suitable unit, say, the number of prints in one order.

In the case where the information about specified image processing that suits the preferences or habits of the customer (photo studio or photographer) has been set in an image input machine or the like, the information that identifies the photo studio or the photographer may be entered so that the corresponding information about the specified image processing can be set for all relevant images.

In the next step, the feature extracting unit 12 in the image correcting apparatus 10 extracts one or more features including the information about face region for each of the recorded images that have been entered (hereinafter referred to as input images) (step S102).

The information about face region may be exemplified by the position information about the face profile, the information about the shape of the interior of the face region, and the information about the color density of the face region. The feature extracting unit 12 first extracts the face region of each image. There is no particular limitation on the way to extract the face region and various known techniques can be employed, such as the method of extracting the region of pixels in the range of flesh color as the face region, and the method of relying upon morphological pattern search.

Subsequently, analysis is performed on the basis of the information about the profile of the extracted face region so as to acquire the information about the position and size of the face region in each image, as well as the information about the color density in the interior of the face region. The detected data on the position and size of the face region is retained for use in processing at later stages.

On the basis of the thus obtained information about the face region, the type of the object in the image, namely, the type of the recorded subject, is preferably extracted as a feature of the input image.

The type of the object may be exemplified by such classifications as human race (e.g. Mongoloid, Negroid or Caucasian), gender, age, and a person in a special scene (e.g. a bride or an illuminated person).

As the information about a feature other than the face region, the feature extracting unit 12 extracts a time stamp or the information about the camera model and the shooting mode from the information in the Exif file (hereinafter referred to as the Exif information) or the information in the appendix file (hereinafter referred to as the appendix information); alternatively, the feature extracting unit 12 extracts the SN ratio for all input images or the order information about image processing.

Among the various features of input images that are extracted in the feature extracting unit 12, the information about face region is essential since it is used to calculate the amount of correction as will be described later. On the other hand, other features may be any information that is required for classification into groups which is also described later; extracted information may only include information about face region or, alternatively, may include one or more of the features described as the case may be.

When the feature or features of each input image have been extracted, the classifying unit 14 takes over and classifies the input images into groups in accordance with at least one of the features extracted in the feature extracting unit 12 (step S103).

A specific method of classifying the input images into groups in the classifying unit 14 is described below.

Images that were recorded within some short period of time may be regarded as consecutive scenes taken under similar shooting conditions and hence are preferably corrected under similar correcting conditions. Hence, a time stamp extracted from the Exif information and the like is used as an image feature and the images that were recorded at time intervals less than a preset threshold are regarded as consecutive scenes and classified into the same group. Since the consecutive scenes are identified by the shooting time, images that should be corrected with the same amount of correction can be chosen automatically.

In addition, images that were recorded with the same camera presumably have similar nature and tendency as determined by the characteristics of the camera, so it is preferred to apply similar correcting conditions. If those images are such that they were recorded in the same shooting mode, it is preferred to bring the correcting conditions even closer to each other. Hence, the information about camera model and the information about shooting mode that have been extracted from the Exif information and the like are used as image features and the input images are classified into groups by camera model and shooting mode.

Noise to image, particularly noise in the low-brightness area, lowers the image quality, so in the case of a noisy image, finishing the whole image so that it has a somewhat darker tone to hold the effect of noise to a minimum may sometimes produce a favorable result. Hence, the SN ratio of each input image is used as an image feature, preferably by detecting in particular the noise from the low-brightness area and noisy images are classified into groups.

Further, if a customer makes some request concerning the image processing of each image, processing must be done in accordance with that request. Alternatively, since different photo studios or photographers have different preferences or habits about image processing, it is preferred to perform image processing in a manner that suits an individual photo studio or photographer. Hence, the order information about image processing is used as an image feature and the images to be corrected are classified into groups by the specifics of the customer's request or in accordance with a specific photo studio or photographer.

The feature or features to be extracted and the method to be used in classifying the input images into groups may be set before the image correcting process is executed. If desired, two or more of the classifying methods described above may be used in combination.

When the input images have been classified into groups, the correction calculating unit 16 takes over and with respect to the images classified into the same group, the amount of correction for that group is calculated with a view to adjusting the face region to have an appropriate color density in accordance with the feature or features that have been extracted in the feature extracting unit 12 and the type of that group.

To this end, an individual amount of correction is first calculated for each of the images in the same group (step S104) and, subsequently, the individual amounts of correction that have been calculated for the respective images in the same group are merged (synthesized) to calculate the amount of correction (common amount of correction) which applies to all images in the group (step S105).

In step S104, the amount of correction of each image is calculated in the following manner.

For each of the input images, the information about face region has been extracted and held as a feature of that image in the feature extracting unit 12 and, hence, an individual amount of correction is calculated in accordance with the thus held feature. In other words, the amount of correction is calculated in such a way that the color density of the face region of each image will approximate a preset target value (target color).

If the same group contains images having different types of objects, it is preferred that, depending upon the type of a specific object, the target value is altered for each image and the amount of correction necessary to attain an appropriate target value is calculated.

To be more specific, if the same group contains an image of a Mongoloid person and an image of a Negroid person, it is preferred to use both a target value for the Mongoloid and a target value for the Negroid as the target values of color density while an appropriate target value is used in accordance with the information about face region.

Particularly in the case of an image recording a person, it is most important that the flesh color of the face region of the person be reproduced beautifully and a preferable target value of flesh color varies from one type of flesh color to another. Hence, by using a target value corresponding to the flesh color of the person as the subject, a value can be obtained that is appropriate as the amount of correction for that particular image.

In the case where the order information concerning image processing has been obtained as an image feature, the amount of correction is preferably calculated in such a way as to produce images that not only satisfy the foregoing considerations but also meet the customer's request or reflect the preferences or habits of the photo studio or the photographer.

If a single image contains more than one face (face region), the amount of correction is calculated for each face and the amounts of correction of the faces in the image are merged (synthesized) to calculate the amount of correction for that particular image. If a single image contains different types of objects, it is preferred that, depending upon the type of each object, the target value of color density is altered by the same method as described above in order to calculate the amount of correction for the images containing different types of objects.

In the next step S105, the individual amounts of correction for the respective images are merged on the basis of a specified rule in accordance with the type of a specific group, thereby calculating a common amount of correction for that group.

The type of a group corresponds to the feature that was used in the classifying step S103. Thus, for the images that have been classified into the same group by the shooting time using the time stamp from the Fxif information, the average or median of the individual amounts of correction that have been calculated in step S104 is used as the common amount of correction.

As described above, the individual amount of correction is determined for each image with reference to the target value of the face region and, hence, in step S105, by using the average or median of the individual amounts of correction of the respective images as the amount of correction that is common to the images in the same group, one can obtain the amount of correction that is appropriate for all images in that group. In addition, by correcting those images with the same amount of correction, one can also reduce the variation in the finish of consecutive scenes or similar scenes. What is more, the result of detection of the face region is used to determine the amount of correction necessary for adjusting the face to have an appropriate color density and, hence, the applied correction, independent of the background, can effectively suppress the occurrence of a density failure or a color failure.

A particular advantage of this mode of altering the target value of color density for each type of object is that if it is applied to the case where the same group comprises images containing different types of objects and even if some of the images have subjects with faces that greatly vary in color density, individual amounts of correction that are appropriate for the respective images are calculated and then merged to ensure effective prevention of a density failure and a color failure.

As for the group of images that have been classified by the information about camera model and the like from the Exif information, the average or median of the individual amounts of correction is used as a common amount of correction and if necessary, the rules of merging the individual amounts of correction may be adjusted in accordance with the information about the characteristics of the camera and the shooting mode.

As for the group of noisy images that have been so classified by SN ratio, the individual amounts of correction, when they are merged to calculate a common amount of correction, are adjusted in such a way that the individual images are finished to have a somewhat dark tone overall.

In the case of images that have been classified into groups by the specifics of a customer's request or by photo studio or photographer, the rules of merging are altered or adjusted in accordance with the customer's request or the preferences or habits of a specific photo studio or photographer.

For instance, if the order information concerning the image processing of the images of that group includes designation of an object that should serve as a reference for image processing, the rules of merging the individual amounts of correction for calculating the common amount of correction are altered and the individual amounts of correction for images containing that object are based upon to calculate the common amount of correction.

There are various other cases for the specifics of the order information concerning image processing; one case is where the information stating that the images were taken by underexposure or overexposure is entered and another case is where given a facial density that varies with the position in the image, typically due to shooting under electronic flash, an instruction is entered to choose which face, the darker or lighter, should be used as a reference. In these cases, the rules of merging the individual amounts of correction are altered such that those which can correct underexposure or overexposure are weighted, or alternatively, the minimum or maximum individual amount of correction is based upon to calculate the common amount of correction for the group of interest.

As described above, the present invention provides more than one method for merging (synthesizing) individual amounts of correction so that the user (operator) can choose the right method depending on the order information and the noise level. This enables the user to cope with various cases where images cannot be appropriately corrected by means of the average amount of correction, such as where the person with the lightest face in images, as exemplified by a bride with face powder on or an illuminated person, needs most appropriate finishing.

In the case of a group containing an image that needs to be corrected with an extremely different amount of correction than the other images of the same group, that image may well be considered a failure and counted out when calculating the common amount of correction for the group. In this case, the variance in the individual amounts of correction may first be evaluated to exclude any variation before calculating the common amount of correction.

Conversely, some of the images in the group may be chosen to merge only the individual amounts of correction for the chosen images.

After the amount of correction for each group has been calculated in the manner described above, the image correcting unit 18 takes over and corrects the images of each group with the common amount of correction for that group (step S106), and the corrected images are then output from the image correcting apparatus 10.

The corrected images as output from the image correcting apparatus 10 are sent to the photographic printer for print preparation. If desired, they may be sent to a display device or a recording device such as a media driver so as to effect image display or storage of image data.

In the image correcting method described above, the result of image correction in step S106 may be displayed on the monitor to check to see if the correction is appropriate; if not, another calculation may be performed under altered conditions; to this end, the process may return to step S105 so that the rules of merging the individual amounts of correction are altered, or it may return to step S104 so that the conditions for calculating the individual amounts of correction are altered, or it may even return to step S103 so that the classifying conditions are altered.

In this case, the amount of correction as calculated for each image in step S104 in order to ensure that the color density of the face region will approximate a preset target value is preferably retained together with the information such as about the position and size of the face region that has been extracted in step S102, so that it is utilized in making a second calculation after the conditions for calculating the individual amounts of correction have been altered. This eliminates the need to repeat the time-consuming step of face detection, which in turn shortens the overall calculation time.

In the foregoing description, all of the images in the same group are corrected in step S106 using the common amount of correction that has been calculated in step S105. This is not the sole case of the present invention and, if desired, such correction may be applied to only some of the images in the group. For instance, an image that has been found a variation as the result of evaluation of the variance in the individual amounts of correction (i.e., an image that is presumably a failure) may be corrected with a common amount of correction as determined from the individual amounts of correction for the other images in the same group; in this way, the image which is apparently a failure can be rescued. It should be noted here that the images other than the failing image may be corrected with their individual amounts of correction.

The image correcting apparatus 10 may preferably rely on the individual amounts of image correction as calculated in step S104 to determine the variation in those amounts and add such variation as the metadata to the corrected images. This offers an advantage that when arranging the corrected images or making a photo album from them, such metadata may, for instance, serve as information on which one may rely to classify those images with the greater variations into a group of failures.

While the image correcting apparatus 10 automatically classifies the respective images into groups in accordance with the features extracted from those images, it may additionally be equipped with a mode in which a list of the images entered at the time of accepting a print order is displayed on the monitor to give the customer an option to determine the images that should be corrected under the same conditions.

Described below is another embodiment of the present invention.

Figure 3:
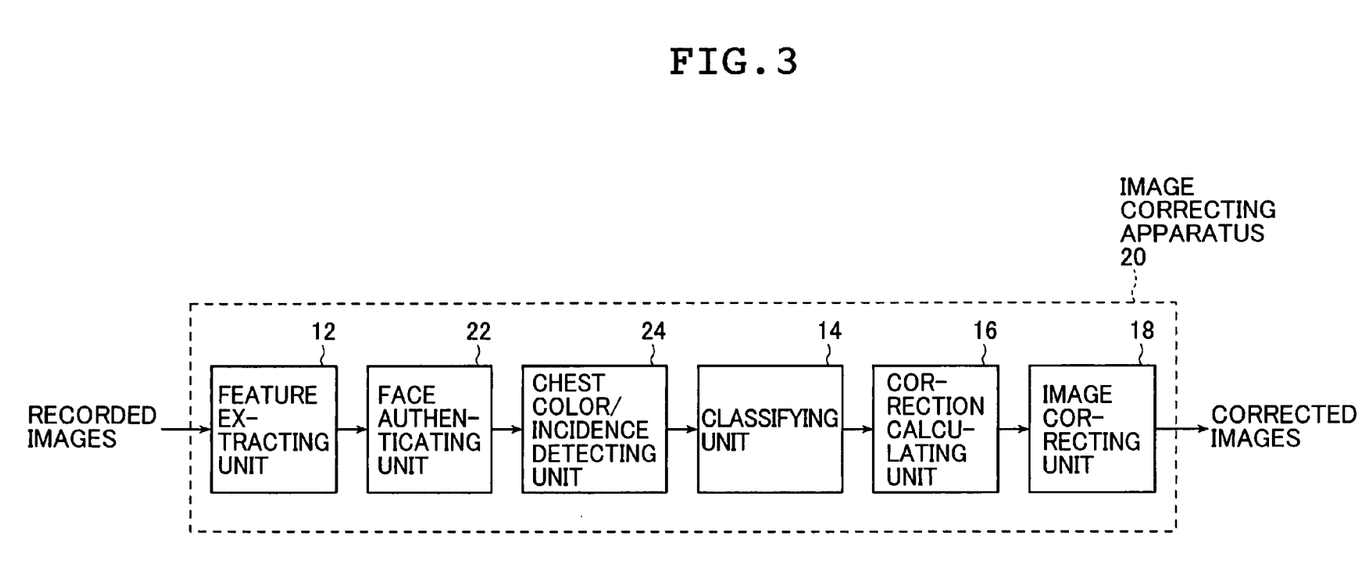
FIG. 3 is a block diagram showing another embodiment of the image correcting apparatus of the present invention.
Figure 4:
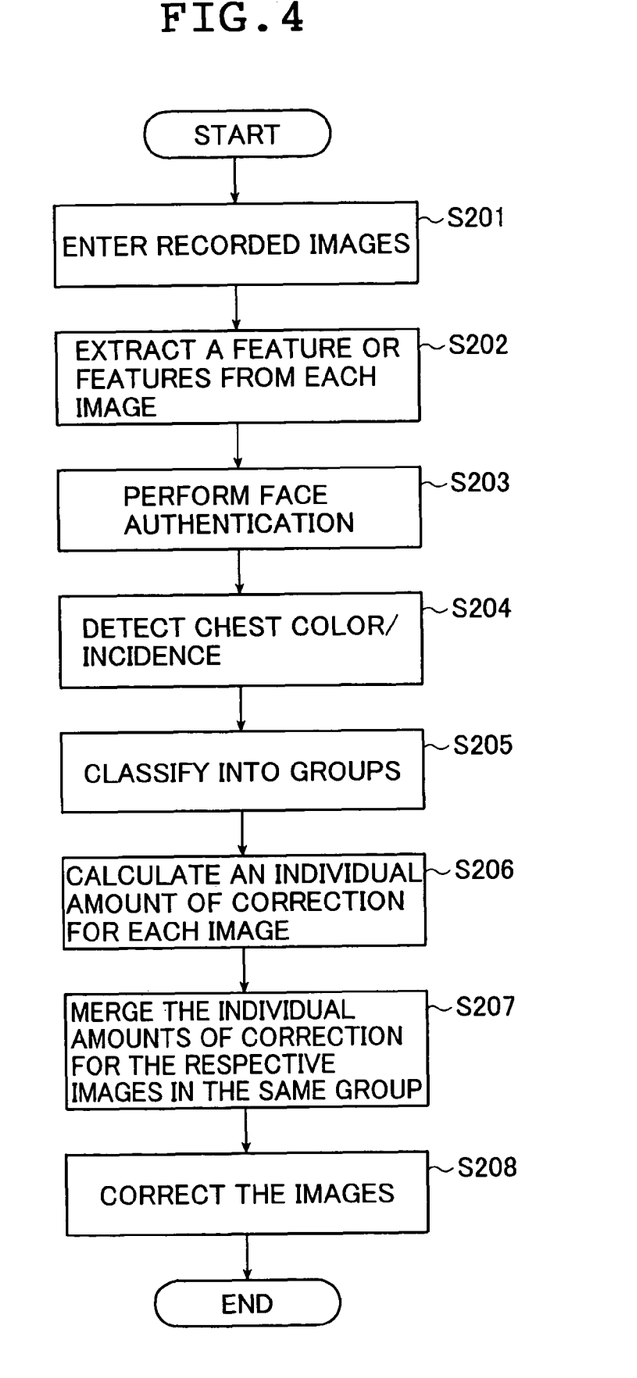
FIG. 4 is a flow chart of the process of image correction which is performed by the image correcting apparatus shown in FIG. 3.

FIG. 3 is a block diagram showing the configuration of an image correcting apparatus according to another embodiment of the present invention which is generally indicated at 20, and FIG. 4 is a flow chart for the process of image correction performed by the image correcting apparatus 20 shown in FIG. 3.

The image correcting apparatus 20 shown in FIG. 3 differs from the image correcting apparatus 10 of FIG. 1 in that it has a face authenticating unit 22 and/or a chest color/incidence detecting unit 24 between the feature extracting unit 12 and the classifying unit 14. Since the other components are essentially the same as those in the image correcting apparatus 10 of FIG. 1, like components are identified by like numerals and will not be described in detail.

The image correcting apparatus 20 of FIG. 3 is first supplied with recorded images (step S201) and one or more features including the information about face region are extracted from each image (step S202). Then, using the information about face region as extracted in the feature extracting unit 12, the face authenticating unit 22 performs face authentication and uses the result to identify images containing the same person (step S203). The method of face authentication is not particularly limited and known techniques may be employed, such as one that depends on pattern matching.

The chest color/incidence detecting unit 24 executes either one or both of the following operations: detecting the color of the clothes near the chest from among the images that were identified to contain the same person in the face authenticating unit 22, and counting the images that record the same person to specify the person of the highest incidence and then specify the images that record that person (step S204).

In addition to those described above as to the first embodiment, the classifying unit 14 can perform further classifications by using the result of face authentication by the face authenticating unit 22 and even the result of chest color detection or incidence detection by the chest color/incidence detecting unit 24 (step S205).

If images showing the same person are classified into groups according to the result of face authentication, the correction calculating unit 16 determines the amounts of correction in such a way as to provide a match in the color of the face of the same person (steps S206 and S207). This contributes to providing images that feature consistent reproduction of the face color.

If classification is to be done using the result of chest color detection in addition to the result of face detection, the correction calculating unit 16 determines the amounts of correction in such a way as to provide a match not only in the face color but also in the color of the clothes near the chest (steps S206 and S207). This contributes to providing consistent images by preventing a color failure or a density failure that may typically occur in images of which larger portions are occupied by clothes of an intense color.

If classification is to be done using the result of detecting the incidence of the same person in addition to the result of face detection, the person of the highest incidence may be assigned the highest weight or the highest weighting factor to calculate the amounts of correction that enable the images of that person to be reproduced in the most appropriate color or colors (steps S206 and S207). Since the person of the highest incidence is usually an important subject, images that are preferred by the customer can be obtained.

Thus, in the second embodiment, the same person is identified by face authentication and on the condition that there be a match in face reproduction of the same person, the images that should be exposed with the same amount of light can be automatically chosen and classified into groups; therefore, high reproducibility of the face color can be obtained for the same person.

As in the first embodiment, the classifying unit 14 may not only perform classification into groups but also calculate the amounts of correction by combining the result of face authentication, chest color detection or incidence detection with the other features also described in the first embodiment.

With the classification and the calculation of the amounts of correction being done in the manner described above, the image correcting unit 18 takes over and corrects the images with the same amount of correction for each group (step S208) and the thus corrected images are output from the image correcting apparatus 20.

The image correcting apparatus 20 of FIG. 3 has the face authenticating unit 22 and the chest color/incidence detecting unit 24 provided as separate entities from the classifying unit 14; alternatively, the face authenticating unit 22 and the chest color/incidence detecting unit 24 may be integrated with the classifying unit 14 so that the operations to be performed by the face authenticating unit 22 and the chest color/incidence detecting unit 24 are executed by the classifying unit 14.

While the image correcting method and apparatus of the present invention have been described in detail on the foregoing pages, the present invention is by no means limited to the two embodiments described above and it should be understood that various improvements and modifications are possible without departing from the scope and spirit of the present invention.

What is claimed is:

1. A method of correcting images performed by an apparatus for correcting images comprising an extracting unit, a classifying unit, a correction unit and an image correcting unit, comprising the steps of:
    extracting two or more features including information about face region and a shooting time of each of photographed images for each of said photographed images by said extracting unit;
    classifying said photographed images into groups of particular photographed images in accordance with a shooting interval for said photographed images of said extracted two or more features by said classifying unit;
    calculating, for said particular photographed images that have been classified in one group by said classifying step, a common correction amount for adjusting said face region to have an appropriate color density in accordance with said extracted two or more features and a type of said one group by said correction unit; and
    correcting said particular photographed images belonging to said one group by said calculated common correction amount by said image correcting unit.

2. The method of correcting images according to claim 1, wherein said extracting step extracts as said feature a type of object in each of said photographed images.

3. The method of correcting images according to claim 2, wherein said calculating step determines said common correction amount in accordance with said extracted type of object such that a color or color density of said face region matches a prescribed target color or color density.

4. The method of correcting images according to claim 3, wherein, in case that said one group contains two or more types of object, said prescribed target color is altered for each type of object.

5. The method of correcting images according to claim 1, wherein said apparatus for correcting images further comprising a face authentication unit, further comprising the step of:
    performing face authentication based on said extracted information about said face region by said face authentication unit,
    wherein said classifying step classifies said photographed images into said groups of said particular photographed images in accordance with a result of said face authentication.

6. The method of correcting images according to claim 1, wherein said calculating step calculates an individual correction amount for each of said photographed images belonging to said one group in accordance with said extracted one or more features, and calculates said common correction amount for adjusting said face region to have said appropriate color density in accordance with said type of said one group based on calculated individual correction amounts for said photographed images belonging to said one group.

7. An apparatus for correcting images, comprising:
- an extracting unit which extracts two or more features including information about face region and a shooting time of each of photographed images for each of said photographed images that have been inputted;
- a classifying unit which classifies said photographed images into groups of particular photographed images in accordance with a shooting interval for said photographed images of said two or more features extracted by said extracting unit;
- a correction calculating unit which calculates, for said particular photographed images that have been classified in one group by said classifying unit, a common correction amount for adjusting said face region to have an appropriate color density in accordance with said extracted two or more features and a type of said one group; and
- an image correcting unit which corrects said particular photographed images belonging to said one group by said calculated common correction amount as calculated by said correction calculating unit.

8. The apparatus for correcting images according to claim 7, wherein said extracting unit extracts as said feature a type of object in each of said photographed images.

9. The apparatus for correcting images according to claim 8, wherein said correction calculating unit determines said common correction amount in accordance with said type of object extracted by said extracting unit such that a color or color density of said face region matches a prescribed target color or color density.

10. The apparatus for correcting images according to claim 9, wherein, in case that said one group contains two or more types of object, said prescribed target color is altered for each type of object.

11. The apparatus for correcting images according to claim 7, further comprising:
- a face authentication unit which performs face authentication based on said information about said face region extracted by said extracting unit,
- wherein said classifying unit classifies said photographed images into said groups of said particular photographed images in accordance with a result of said face authentication performed by said face authentication unit.

12. The apparatus for correcting images according to claim 7, wherein said correction calculating unit calculates an individual correction amount for each of said photographed images belonging to said one group in accordance with said one or more features extracted by said extracting unit, and calculates said common correction amount for adjusting said face region to have said appropriate color density in accordance with said type of said one group based on individual correction amounts calculated by said correction calculating unit for said photographed images belonging to said one group.

13. The method of correcting images according to claim 5, wherein said apparatus for correcting images further comprising a chest color/incidence detecting unit, further comprising the step of:
- executing either one or both of following operations: detecting color of clothes near a chest from among said photographed images that were identified to contain a same person in said face authenticating unit, and counting said photographed images that record said same person to specify a person of a highest incidence and then specify photographed images that record said specified person by said chest color/incidence detecting unit,
- wherein said classifying step classifies said photographed images into said groups of said particular photographed images in accordance with a result of said face authentication and at least one of a result of detecting said color of said clothes near said chest and a result of detecting said incidence of said same person.

14. The apparatus for correcting images according to claim 11, further comprising:
- a chest color/incidence detecting unit which executes either one or both of following operations: detecting color of clothes near a chest from among said photographed images that were identified to contain a same person in said face authenticating unit, and counting said photographed images that record said same person to specify a person of a highest incidence and then specify photographed images that record said specified person,
- wherein said classifying unit classifies said photographed images into said groups of said particular photographed images in accordance with a result of said face authentication performed by said face authentication unit and at least one of a result of detecting said color of said clothes near said chest and a result of detecting said incidence of said same person executed by said chest color/incidence detecting unit.

* * * * *